Nov. 27, 1951  J. MAZZOLA  2,576,350
SPRING CHUCKING DEVICE
Filed Nov. 24, 1947  3 Sheets-Sheet 2
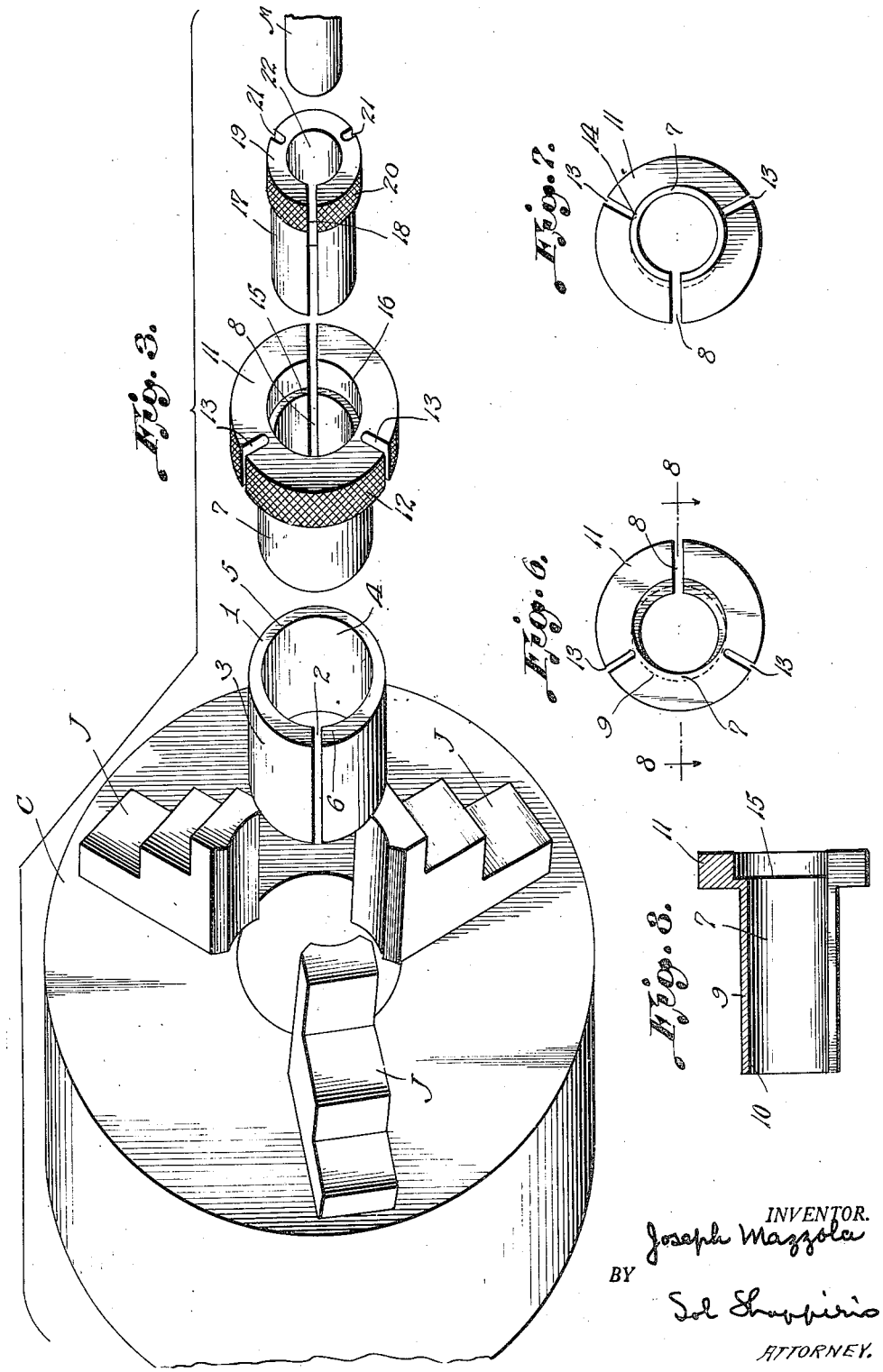
INVENTOR.
Joseph Mazzola
BY
Sol Shappirio
ATTORNEY.

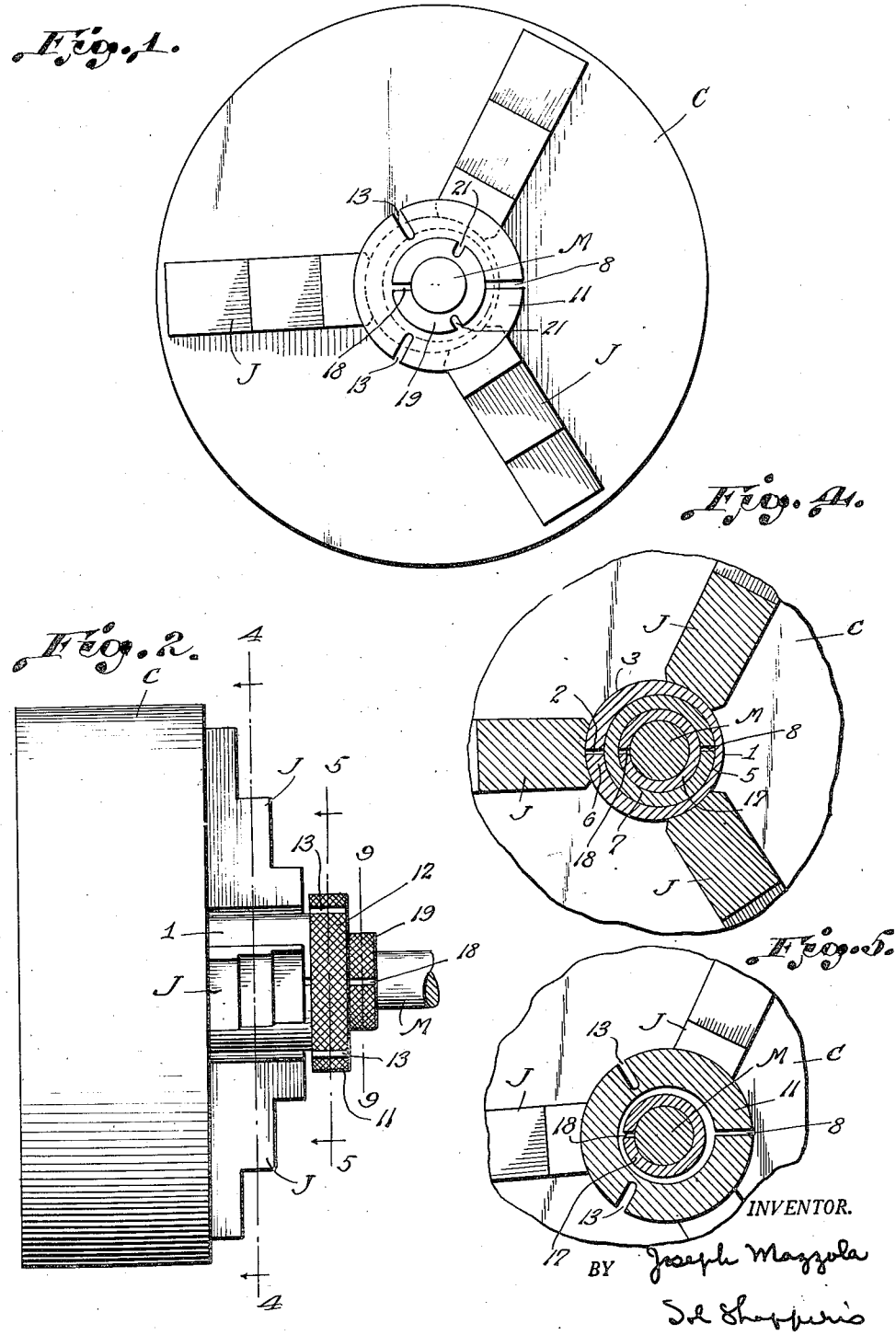

Nov. 27, 1951     J. MAZZOLA     2,576,350
SPRING CHUCKING DEVICE

Filed Nov. 24, 1947     3 Sheets-Sheet 3

INVENTOR.
Joseph Mazzola
BY
Sol Shapiro
ATTORNEY.

Patented Nov. 27, 1951

2,576,350

UNITED STATES PATENT OFFICE 2,576,350

SPRING CHUCKING DEVICE

Joseph Mazzola, Washington, D. C.

Application November 24, 1947, Serial No. 787,836

3 Claims. (Cl. 279—6)

This invention relates to spring chucking devices particularly for use in connection with chucks in machining operations.

In the use of chucks and similar chucking devices on lathes and other machines, as for example, in the common type geared scroll-chuck such as the commonly employed three jaw chuck, after use for some time there is excessive wear so that the work piece held in such chuck runs in an untrue manner with resultant unsatisfactory machining of the work piece. Under such circumstances and they frequently arise even after relatively short use of chucks, the machinist finds it difficult to compensate for such untrue rotation and manipulation of the chuck and work piece to make it run true under these circumstances becomes a tedious, time-consuming operation.

Among the objects of the present invention is the production of a tool or chucking device which eliminates and compensates for any untrue rotation in such chucks.

Other objects include a tool for these purposes which permits easy and ready adjustment for centering the work piece to be machined.

Still further objects include such tools or chucking devices which may be easily and economically manufactured.

Still further objects and advantages of the present invention will appear from the more detailed description set forth below, it being understood that such more detailed description is given by way of illustration and explanation only, and not by way of limitation, since various changes therein may be made by those skilled in the art without departing from the scope and spirit of the present invention.

Figure 9:
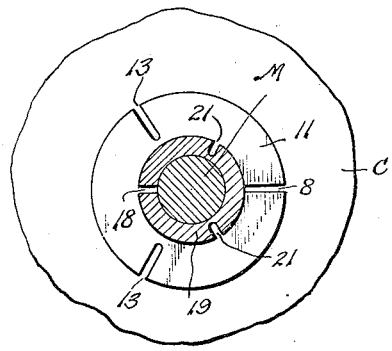
Figure 10:
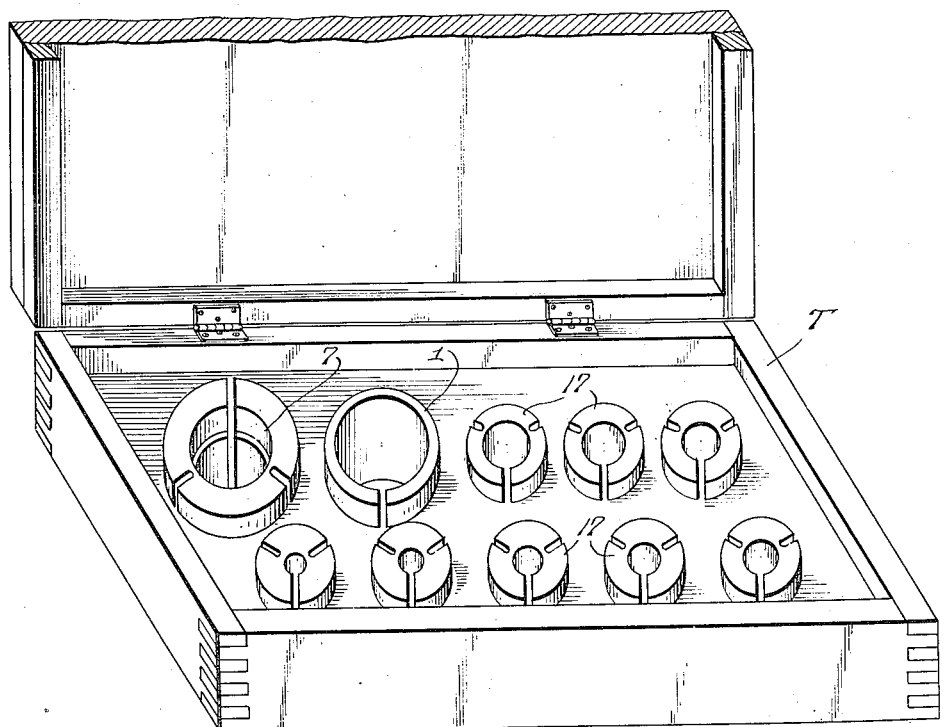

In connection with such more detailed description, there is shown in the accompanying drawings, in Figure 1, a front elevation of a three jaw chuck carrying the assembled tool of the present invention; in Figure 2, a side elevation of the device of Figure 1, partly in section; in Figure 3, an exploded view in perspective of the chuck and the elements of the tool or spring chucking device of the present invention; in Figure 4, a section on the line 4—4 of Figure 2; in Figure 5, a section on the line 5—5 of Figure 2; in Figure 6, a front elevation of the eccentric split tube element of the device; in Figure 7, a rear elevation of the parts shown in Figure 6; in Figure 8, a section on the line 8—8 of Figure 6; in Figure 9, a section on the line 9—9 of Figure 2; and in Figure 10, an assembly of the tool and alternative collets of the present invention.

In accordance with the present invention, a tool or spring chucking device is supplied which enables ready adjustment for centering material or work pieces to be machined, to eliminate and compensate for any untrue rotation in a chuck, by making such tool from a multiplicity of telescoping tubular members, some of which are eccentric, so that the several telescoping parts may be adjusted with respect to each other to compensate for any untrue rotation of the material or work piece to be machined. As shown in the drawings, illustrating the chuck by the commonly used three jaw chuck C having jaws J, the assembled tool T is shown in position in the chuck in Figure 1 and in section in Figure 2. The tool consists of an outer split eccentric sleeve 1 having the split or opening 2 therein, to supply resiliency and flexibility to such sleeve 1. The circumferential surface 3 and inner wall 4 of the sleeve 1 are cylindrical surfaces, on eccentric axes, so that at one point 5 of the sleeve 1, the wall thickness is a minimum while at the opposite point 6, the wall thickness of the sleeve 1 is a maximum. The outer diameter of the sleeve 1 is made so that it may be readily gripped in the jaws J, of the chuck C, and by rotating the sleeve 1 within the jaws J of the chuck C, the eccentricity of the sleeve 1 may be made to compensate to a certain extent for any eccentricity of these jaws J.

Within the sleeve 1, an eccentric split tube 7 is provided, the outer diameter of the tube 7 being of such size as to fit snugly within the sleeve 1 but to be rotatable therein prior to final tightening of the jaws J. The tube 7 is split as shown at 8 to give greater resiliency and flexibility thereto. The circumferential surface 9 and inner wall 10 of the split tube 7 are cylindrical surfaces on non-concentric axes so that the split tube 7 is also eccentric. On one end of the split tube 7 a flange 11 is provided having a knurled periphery 12 enabling the tube 7 to be readily positioned and adjusted within the sleeve 1. In order to give sufficient resiliency and flexibility to the tube 7, longitudinal grooves 13, 13 may be provided in the flange 11 and the tube 7 as shown at 14. The grooves 13, 13 and split 8 may desirably be placed at 120° from each other to provide substantially uniform flexibility in the sleeve 7. The tube 7 may be provided with an enlarged bore 16, to accommodate the larger size collets in a manner to be described presently, the bore defined by the wall 10 serving to accommodate the smaller range of collets.

The sleeve 1 and tube 7 may be readily assembled together with the tube 7 fitting snugly but rotatably within the sleeve 1 and the latter placed in the jaws J of the chuck C. Rotation of the tube 7 within the sleeve 1, due to the eccentric axes of the wall 4 and surface 9 enables ready adjustment of the parts to provide true concentricity with the headstock axis of the lathe or other machine tool to which the device may be applied. While the sleeve 1 and tube 7 may be used for reception of the material or work piece to be machined, in order to permit ready use with work pieces of varying diameters, a series of collets may be provided, the bores of the collets being of varying sizes. Each collet may take the form of a cylindrical split tube such as the tubular member 17 adapted to fit snugly but rotatably within the tube 7, the outer face and inner wall of the tube 7 being concentric cylindrical surfaces. The collet 17 is provided with a slot 18 to give resiliency and flexibility. At one end, the collet may be provided with a flange 19 having a knurled periphery 20. Longitudinal grooves 21, 21 may be provided in the flange 19 and collet 17 in order to give the necessary resiliency and flexibility thereto. The slot 18 and longitudinal grooves 21, 21 are desirably arranged at equidistant points about the cross-section of the collet 17, as for example, 120° apart. The collet may be readily inserted within the tube 7, and where an enlarged bore 16 is provided in the tube 7, the outer diameter of the collet 17 will be of such size as to fit snugly but rotatably within such enlarged bore 16 in the sleeve 7, the collet being pushed inwardly until it rests against the shoulder 15 of the tube 7.

The collet 17 is adapted to receive the material or work piece M on which the machining operations are to be performed. Since work pieces or material to be machined may vary substantially in diameter, a series of collets 17 are provided having inner diameters 22 of varying sizes, all of which will fit within the tube 7, but which due to the varying sizes of openings 22 in the collets, enable the device to be employed with work pieces M of varying diameter. Thus an entire set may be produced and sold as a kit as illustrated in Figure 10, where a container T of any usual type may be provided to hold a set of elements including a split eccentric sleeve 1, a split eccentric tube 7, and a series of collets 17 of varying sizes, the sizes of the openings 22 in the collets 17 being provided in regular decreasing diameters.

The use of the tool of the present invention will appear from what has been set forth above in the description of the elements and their relation. The sleeve 1, tube 7, and collet 17 when the latter is employed as is most desirable, are assembled together one within the other and placed within the jaws of the chuck while the latter are open sufficiently, and the work piece M inserted within the collet 17. The parts are then manipulated and the eccentricity of the sleeve 1 and tube 7 permit adjustment of the parts with respect to each other and with respect to the jaws of the chuck so that absolutely true rotation of the work piece M is obtained. A true centering effect is readily secured in this way despite the fact that the chuck may, due to wear, run untrue if used without the present invention. The elements of the tool of the present invention are readily produced by machining operations, from any desired stock material such as iron, steel, brass, etc. The free springing action of the parts enables ready assembly and use of the device. Where a series of collets of varying size openings are employed, they may have any desired dimensions, as for example, running from $\frac{1}{32}$ inch in diameter to 1 inch in diameter through regular gradations of $\frac{1}{16}$ inch, or larger or smaller diameters may be employed as desired.

Having thus set forth my invention, I claim:

1. A chucking device comprising a first split sleeve member, the circumferential and inner wall surfaces being eccentric with respect to the longitudinal axis thereof, a second split sleeve member rotatably received within said first sleeve member, the circumferential and inner wall surfaces of said second sleeve member being eccentric with respect to each other, and a collet comprising a split sleeve received within said second sleeve member and having a longitudinal bore and a concentric outer surface whereby said first sleeve member may be clamped in the jaws of a chuck thus clamping a work piece in said collet, and the concentricity of said work piece with respect to the true center of said chuck being adjusted by relative rotation between said first sleeve member and said chuck and between said first and second sleeve members to compensate for wear in said chuck and accurately center said work piece.

2. A chucking device comprising a first split sleeve member, the circumferential and inner wall surfaces being eccentric with respect to the longitudinal axis thereof, a second split sleeve member rotatably received within said first sleeve member and having an enlarged knurled flange, a plurality of angularly spaced grooves in said flange and said second sleeve member to impart flexibility thereto, the circumferential and inner wall surfaces of said second sleeve member being eccentric with respect to each other, and a collet comprising a split sleeve received within said second sleeve member and having a longitudinal bore and a concentric outer surface whereby said first sleeve member may be clamped in the jaws of a chuck thus clamping a work piece in said collet and the concentricity of said work piece with respect to the true center of said chuck being adjusted by relative rotation between said first sleeve member and said chuck and between said first and second sleeve members to compensate for wear in said chuck and accurately center said work piece said knurled flange facilitating such adjustment.

3. A chucking device comprising a first split sleeve member, the circumferential and inner wall surface being eccentric with respect to the longitudinal axis thereof, a second split sleeve member rotatably received within said first sleeve member and having an enlarged knurled flange, a plurality of angularly spaced grooves in said flange and said second sleeve member to impart flexibility thereto, the circumferential and inner wall surfaces of said second sleeve member being eccentric with respect to each other, an enlarged bore in one end of said second sleeve member, the wall of said enlarged bore being eccentric with respect to the circumferential surface of said second sleeve, and a collet comprising a split sleeve received within said second sleeve member and having a longitudinal bore and a concentric outer surface whereby said first sleeve member may be clamped in the jaws of a chuck thus clamping a work piece in said collet and the concentricity of said work piece with respect to the true center of said chuck being adjusted by relative rotation between said first sleeve member and said chuck and between said first and second sleeve members to compensate for wear in said chuck and accurately center said work piece, said knurled flange facilitating such adjustment.

JOSEPH MAZZOLA.

REFERENCES CITED

The following references are of record in the file of this patent:

UNITED STATES PATENTS

| Number | Name | Date |
|---|---|---|
| 1,125,780 | Waite | Jan. 19, 1915 |
| 1,189,926 | Ellis | July 4, 1916 |
| 2,284,394 | Klein | May 26, 1942 |
| 2,420,067 | Crozier | May 6, 1947 |

FOREIGN PATENTS

| Number | Country | Date |
|---|---|---|
| 26,860 | Denmark | Nov. 8, 1920 |